TAPE RECORDER DRIVE

Filed Dec. 22, 1959

8 Sheets-Sheet 1

INVENTORS
Heinrich Wehde
Hans-Georg Lange
Georg Fischer &
Manfred Spreng

BY George H. Spencer
ATTORNEY

INVENTORS
Heinrich Wehde
Hans-Georg Lange
Georg Fischer &
Manfred Spreng
BY George H. Spencer
ATTORNEY INVENTORS
Heinrich Wehde
Hans-Georg Lange
Georg Fischer &
Manfred Spreng BY George H. Spencer
ATTORNEY INVENTORS
Heinrich Wehde
Hans-Georg Lange
Georg Fischer &
Manfred Spreng
BY George H. Spencer
ATTORNEY INVENTORS
Heinrich Wehde
Hans-Georg Lange
Georg Fischer &
Manfred Spreng
BY
George H. Spencer
ATTORNEY Aug. 28, 1962 H. WEHDE ET AL 3,051,406

TAPE RECORDER DRIVE

Filed Dec. 22, 1959 8 Sheets-Sheet 6

INVENTORS
Heinrich Wehde
Hans-Georg Lange
Georg Fischer &
Manfred Spreng
BY George H. Spencer
ATTORNEY INVENTORS
Heinrich Wehde
Hans-Georg Lange
Georg Fischer &
Manfred Spreng
BY George H. Spencer
ATTORNEY INVENTORS
Heinrich Wehde
Hans-Georg Lange
Georg Fischer &
Manfred Spreng
BY George H. Spencer
ATTORNEY United States Patent Office 3,051,406

Patented Aug. 28, 1962

3,051,406

TAPE RECORDER DRIVE

Heinrich Wehde, Hamburg-Rissen, and Hans-Georg Lange, Georg Fischer, and Manfred Spreng, Wedel, Holstein, Germany, assignors to Telefunken G.m.b.H., Berlin, Germany Filed Dec. 22, 1959, Ser. No. 861,258
Claims priority, application Germany Dec. 24, 1958
18 Claims. (Cl. 242—55.12)

The present invention relates to a drive system for magnetic tape recorders, particularly, of the type used in digital computers.

The use of magnetic tapes for storing signals representing digital intelligence has been known in the computer art. The storage and feed means for the tape has to satisfy conditions which differ from the requirements in sound recording and reproducing magnetic tape recorders. Tape recorders used for storage and reproducing digital intelligence have to have starting and stopping acceleration intervals of a few milliseconds, which is a particularly difficult requirement when the tape speed is high, for example, several yards per second. The drive means used for common tape recorders cannot be used satisfactorily because the tape reels have considerable mass which cannot be accelerated fast enough. Furthermore, the tape probably would tear.

It has also been known in the art to drive the tape by a friction device, but to separately control the reeling motors driving the reels from which the tape is unwound or on which it is wound, while also providing tape loops which are formed on both sides of the point at which the tape itself is driven. When the tape is accelerated or decelerated, one loop contracts while the other one expands. Scanning means are provided to detect the size of the loops and the scanner then controls the two reeling motors in such a manner, that one of them winds up the tape of a loop whenever this loop has reached a certain length, while the other motor unwinds tape whenever the associated loop has contracted to a predetermined size, and then a certain amount of tape will be added to increase the loop. In this case, the tape drive itself must accelerate during starting only that portion of the tape which is present between the two loops. The reels are driven by powerful motors in order to expand or to contract the loops as fast as possible. The motors always have to start from the rest position and come up to full speed. Also, upon turning off, the motors have to stop fast or else, one loop would become too big and no loop would remain on the windup side. Thus, strong brakes are necessary to counteract the considerable starting power of the motors.

It is an object of the present invention to provide for new and improved drive equipment for tape recorders in which the tape must be transported at high speed, and started and stopped during very short time intervals.

According to one aspect of the invention in an embodiment thereof magnetically operated clutches are provided to selectively couple one or more of the driven shafts in a tape recorder either to one or more continuously running driving means, or to a part of the recorder which is stationary for braking purposes.

The invention yields a considerable saving in power and expenditure. It is possible to use only a single motor running at a constant speed. With only 2 watts control power per reel shaft, these magnetic clutches transmit the necessary torque for acceleration or deceleration of a winding reel.

Heretofore, the control power for a motor to be started and stopped was higher by one order of magnitude.

The clutches serve as electromechanical amplifiers. The mass of the clutch elements to be accelerated can be kept quite small and the couplings may be designed to be of light weight, so that they also can be used for braking the reels. Due to the fact that such clutches can transmit large torques even with small control power input, the entire recorder can be designed for reels of any size, i.e., mass.

This principle of controlling the winding of the tape on and from the reels can be extended to the drive of the tape itself, i.e., the drive capstan thereof. This additional clutch for controlling the drive capstan of the tape can be connected with a separate motor or, alternatively, the same motor driving the reels can be used. This provides another saving of cost and of power. In known tape recorders, the tape usually is driven by an idler pressed against a continuously running capstan. Necessarily, a large slippage is produced at the moment when the tape is at rest and then engages the running capstan, whereby the unyielding base layer of the tape is highly tensioned, which tension may disturb the stored signals. However, if a magnetic clutch is used according to the present invention for controlling the drive of the tape, the latter is in constant engagement with a friction idler. No slippage is caused upon starting, as the tape and the capstan start together. Thus, no intelligence losses occur in the tape. This is independent of how high the final tape speed will be.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a perspective view of a tape recorder deck according to the invention;

FIGURE 1*a* is a simplified diagram of a control circuit for tape feeding in the recorder shown in FIGURE 1;

FIGURE 1*b* is a cross section through a pressure sensing element to be used in the recorder shown in FIGURE 1;

Figure 6:
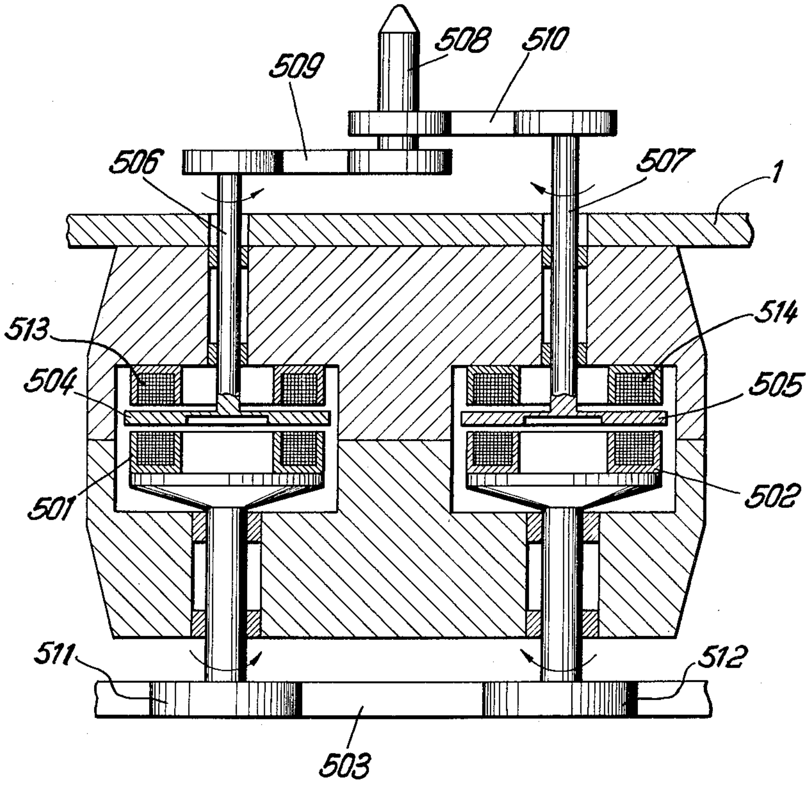
FIGURE 6 is a cross section through a double-clutch used in a modification of the device shown in FIGURE 1.
Figure 6A:
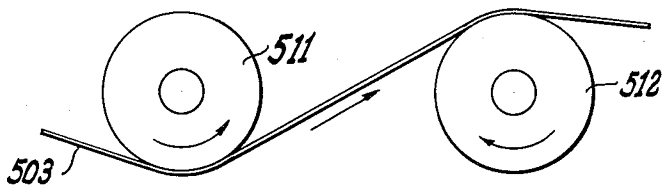
Figure 7:
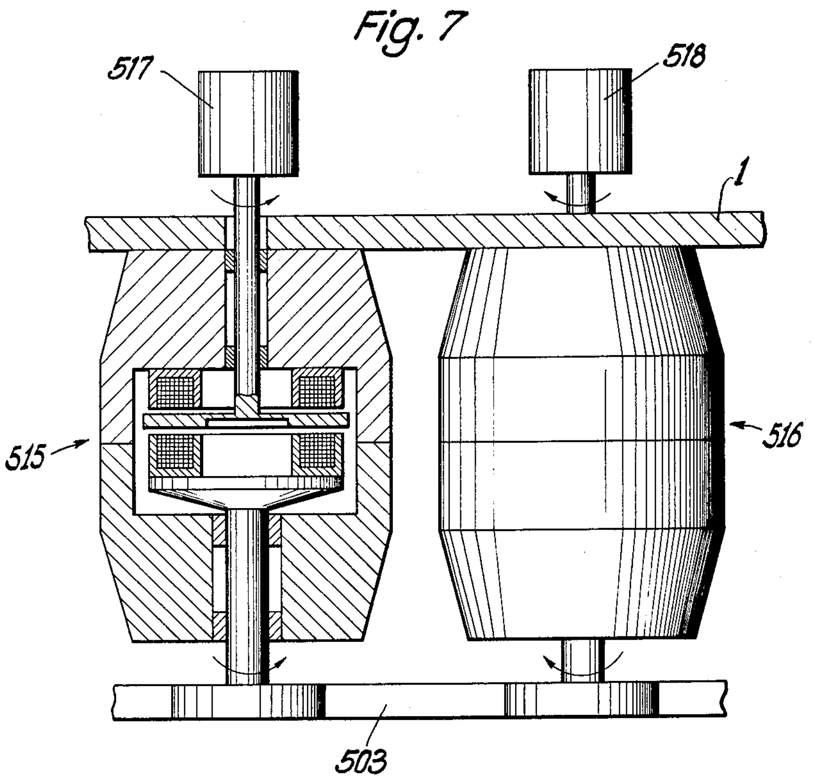
Figure 8:
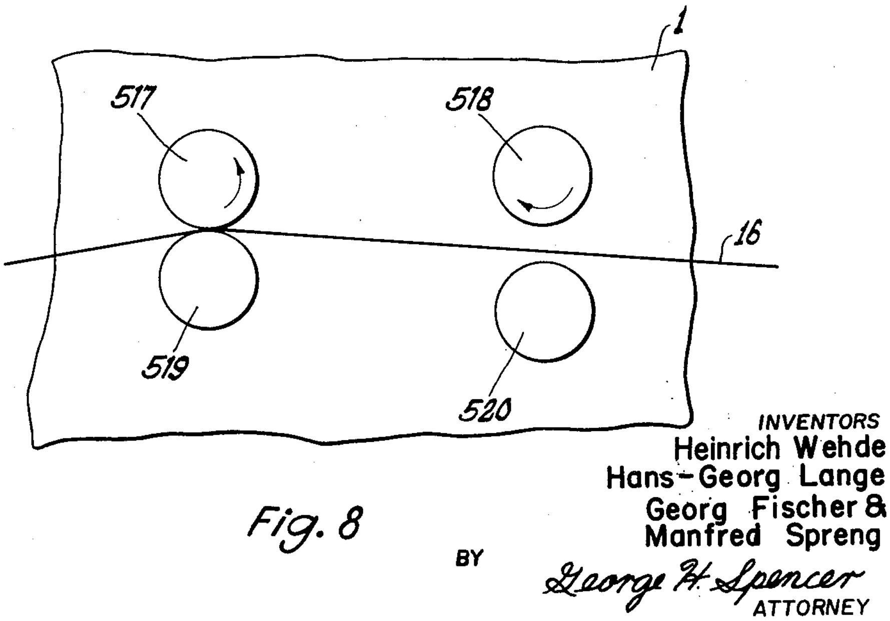

FIGURE 6*a* is a simplified bottom view of the clutch shown in FIGURE 6;

FIGURE 7 is a side view partly in section of another double-clutch usable similarly as the clutch shown in FIGURE 6; and FIGURE 8 is a top view of the device shown in FIGURE 7.

Figure 1:
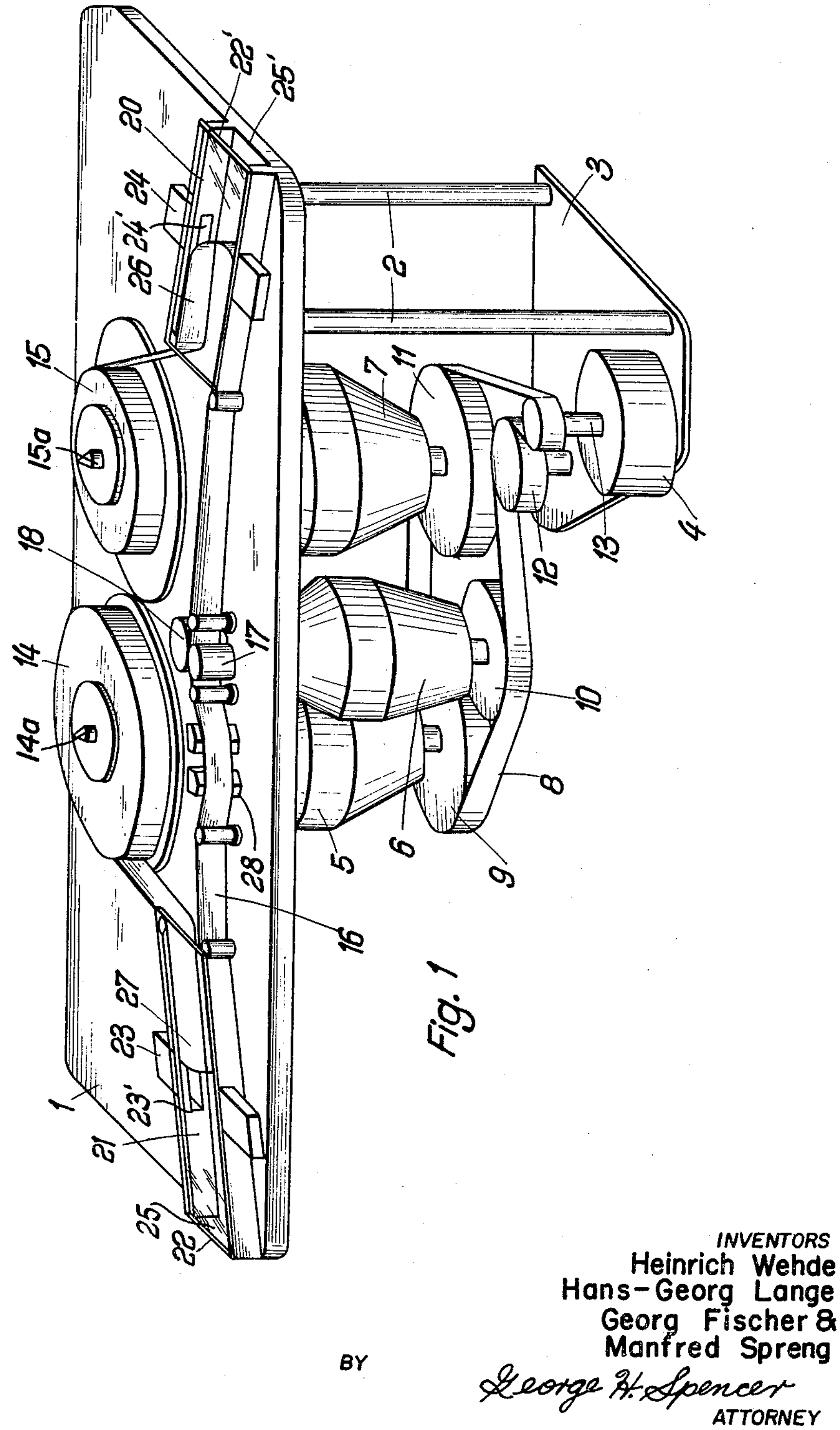

In FIGURE 1, a base plate 1 supports a magnetic tape storage and drive device. This plate 1 may be a part of a fixed housing. Pillars 2 secured to plate 1 support a second plate 3 on which is mounted a part of the drive including an electric motor 4, the drive shaft 13 of which is coupled to a tension pulley 12 and to wheels 9, 10 and 11 by means of a driving belt 8. Magnetic clutches 5, 6 and 7 have their lower drive members connected to wheels 9, 10 and 11, respectively. The clutches 5 and 7 are connected at their upper driven members to spindles 14a, 15a, which carry reels 14, 15, while the driven member of clutch 6 is connected to the capstan 18 for driving a magnetic tape 16. Thus, for driving the two reels 14 and 15 and the capstan 18, there is provided only one single drive motor which is a particularly advantageous arrangement from the point of view of economy. However, one can of course use three separate motors, one for each clutch or, there may be used one motor for driving the two reels and another motor for the tape capstan. The motor 4 is to be connected to an appropriate power source via a switch (not shown) in a manner generally known in the art.

When turned on, the motor starts and drives the magnetic clutches 5, 6 and 7 via the belt 8. Furthermore, at the same time the motor is started, the tape 16 is pressed against the capstan 18 by means of a counterpressure idler 17. The capstan is always in engagement with the tape 16. If now, for example, the magnetic clutch 6 is energized, for example, by a control signal from a computer, the capstan 18 starts to rotate and drives the tape. The belt 8 is provided with a toothed inner surface for positive drive, in order to avoid slippage, particularly during the starting period. Vacuum chambers 21 and 22 are located on plate 1 to the right and to the left of the tape drive capstan, which chambers are covered by transparent plates 22 and 22', respectively. In the chambers, loops 26 and 27 of the tape 16 are formed for further usage. The forming of the loops can be carried out in various ways. In the example of the invention shown in the drawing, the loops are produced pneumatically. Openings 25 and 25' are provided for connection with a vacuum producing device, a pump or the like, to produce a suction causing the tape 16 to enter the chambers 20 and 21. The vacuum applied determines the magnitude of the feeding tension to be exerted on the tape. The chambers are arranged in such a manner, that the loops enter them at a flat angle in order to keep the friction of the tape at the edges of the chamber as low as possible whereby the wear and tear on the tape is reduced even at high speeds. The tape itself is guided in such a manner that the magnetizable layer thereon only touches a magnetic recording and/or reading head 28, but not any other guiding means. The loops may be monitored by pneumatic or optical instruments shown schematically by 23 and 24. Monitors of this kind are known per se and usually comprise a pressure source or a light source partially, or at times totally, masked by the loop and a pressure or a light-sensitive organ monitoring the degree of masking and producing an electrical output signal dependent thereon. It is particularly desirable that the monitoring be carried out with little or practically no delay which, in turn, means that the monitor has to be operated by electronic circuitry.

Figure 1A:
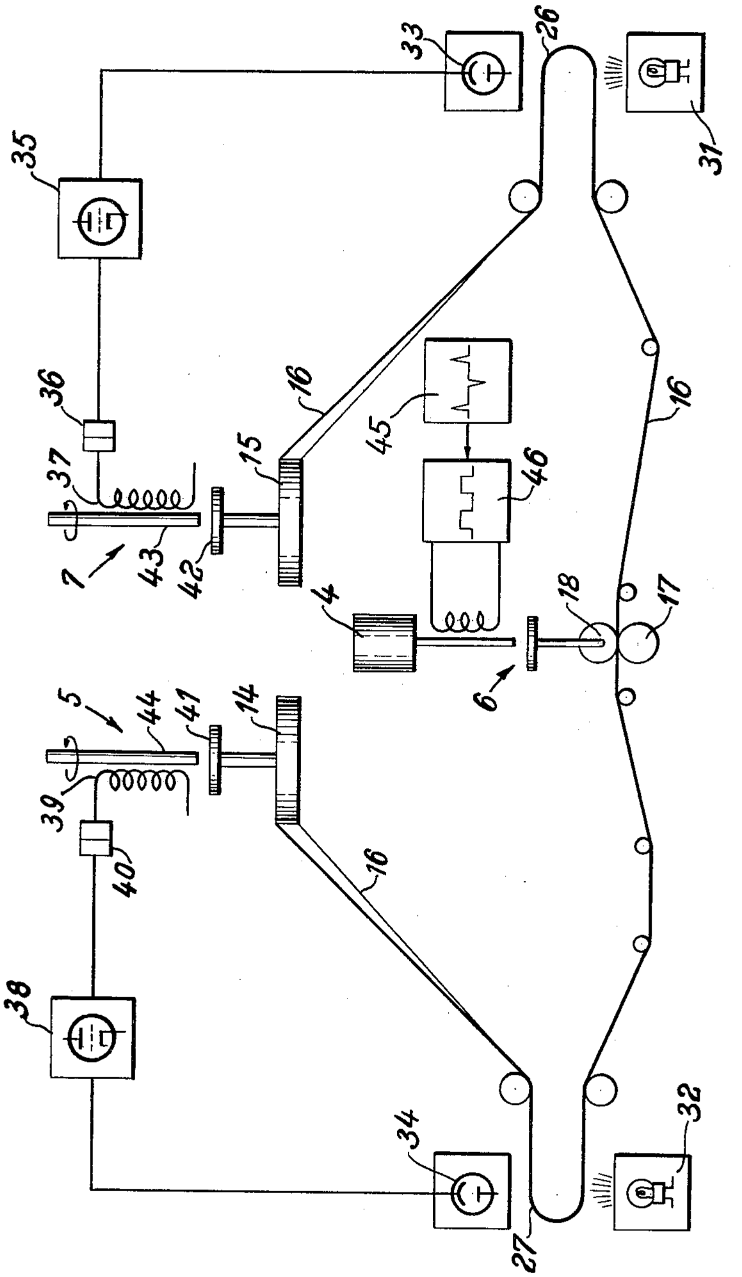

In FIGURE 1*a* is shown a schematic circuit diagram for use with the arrangement shown in FIGURE 1. The loops 26 and 27 are positioned in the light path between light sources 31 and 32 and photocells 33 and 34, respectively. Photocells 33 and 34 correspond to the scanners 23 and 24 in FIGURE 1. The output of photocell 33 may be amplified and fed to an electronic switch 35 of a known type. This switch turns on an output current when the loop 26 substantially covers the light path and then, after a predetermined time, the current is turned off. Thus, switch 35 may, for example, be a monostable multivibrator. The output current of switch 35 is fed via brushes 36 to the exciter coil 37 of the clutch 7, said coil continuously rotating together with core 43, i.e., it is connected to wheel 11 of FIGURE 1. For reasons of clarity, electrical connections are shown only as unipolar, however, it is to be understood that they are all bipolar. The control elements 33, 35, 36 and 37 thus cause the clutch to be activated whenever the loop 26 has exceeded a certain length and the time constant of switch 35 is proportioned so that just the amount of tape in the loop is wound upon spool 15. Switch 35 can also be designed to be a two-level switch, turning the exciter current for coil 37 on when the loop has exceeded a certain length (maximum darkness) and that it turns the current for coil 37 off when the loop has decreased below a certain length (maximum brightness) in photocell 33.

Photocell 34 delivers an output signal to a switch 38 which operates inversely as switch 35. Switch 35 turns the current in a coil 39 of clutch 5 on when the length of loop 27 has decreased below a certain amount (maximum brightness for photocell 34). Switch 38 turns the exciter current for coil 39 off when the loop has increased by a certain length (maximum darkness). Of course, switch 38 can also be a monostable multivibrator operating with a predetermined time constant for keeping the current flowing in coil 39. Coil 39 energizes a core 44 and is mounted therewith on the continuously rotating part of clutch 5 which is rotatably connected to wheel 9 in FIGURE 1. The current is fed via brushes 40 to coil 39. Elements 34, 38, 39 and 40 thus control the unwinding of tape 16 from reel 14. 41 and 42 denotes ferromagnetic discs rotatably connected to reels 14 and 15, respectively, and coupled with rotating cores 44 and 43, respectively, whenever current flows in coils 39 and 37, respectively. Clutch 6 controls the tape capstan as mentioned above and is, in turn, controlled by a computer 45 producing trigger pulses which are connected into rectangular switching pulses in power unit 46 for intermittently controlling the tape capstan by controlling the current in clutch 6.

The monitors 33 and 34 serve to control the magnetic clutches with a delay of less than two milliseconds response time. In particular, the electronic output stages of the monitors have to have a high ohmic impedance circuit, as compared with the ohmic value of the control circuit for the magnetic clutches. To achieve this result, it has been found advantageous to employ a photoelectric scanner, using a silicon photo diode or a high vacuum photocell therein. Here, the high ohmic impedance of the photoelectric amplifier stage is easily accomplished as known per se.

Figure 1B:
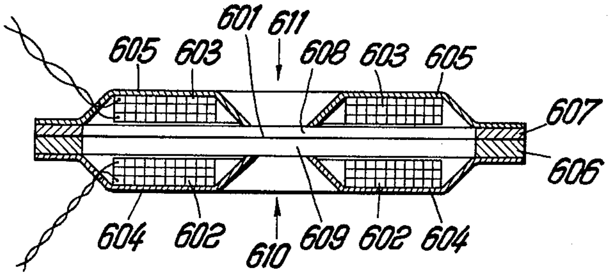

A pneumatic pressure box may also be used, particularly in case where the loops are produced pneumatically. Such pressure-scanning and detecting device, using an inductive detecting circuit is shown in FIGURE 1*b*. 601 is a ferromagnetic membrane on which the pressure to be detected is exerted. 602 and 603 are ring-shaped coils positioned on opposite sides of the membrane and housed in housings 604 and 605, respectively, which are also made of ferromagnetic material. Two ring-shaped spacer pieces 606 and 607, also made of ferromagnetic material, and positioned between the membrane and the outer edges of the housings, create two air gaps 608 and 609 of a width equal to the thickness of the rings 606 and 607. If the coils are fed with current of the same frequency, and if the pressure acts either in the direction of arrow 610 or in the direction of arrow 611, the gaps change, because the center portion of the membrane gives way in accordance with the pressure. Thereby, a voltage difference is produced between the voltages across coils 602 and 603. The pressure producing this voltage may be detected in the device shown in FIGURE 1, in that a longitudinal slot 23' or 24', or a row of little holes are positioned at one side of each of the chambers 20 and 21. Slots or holes communicate with the membranes such as 601 in FIGURE 1*b*, which membranes are positioned in the monitors 23 and 24. When the loops 26 and 27 are within the range of the slots, the monitors such as the one shown in FIGURE 2, obtain a pressure which corresponds to the lengths of the loops. The deflection of the membrane produces an amplitude modulation of the A.C. voltage supplied to the inductive coils of the monitor. In particular, a difference voltage taken from coils 602 and 603 in FIGURE 2 comprises such an amplitude modulated voltage. Such voltage produced by monitors 23 and 24 in FIGURE 1 are fed to high ohmic amplifiers which may be incorporated in the monitors and serve as switches. The amplifier outputs then serve for controlling the clutches 5 and 7.

The couplings, in general, are made of ferromagnetic discs of a configuration resembling a diaphragm. These discs are connected to the driven shafts of the clutches and may selectively engage electromagnets driven by belt 8 or they may engage stationary electromagnets for braking.

Figure 2:
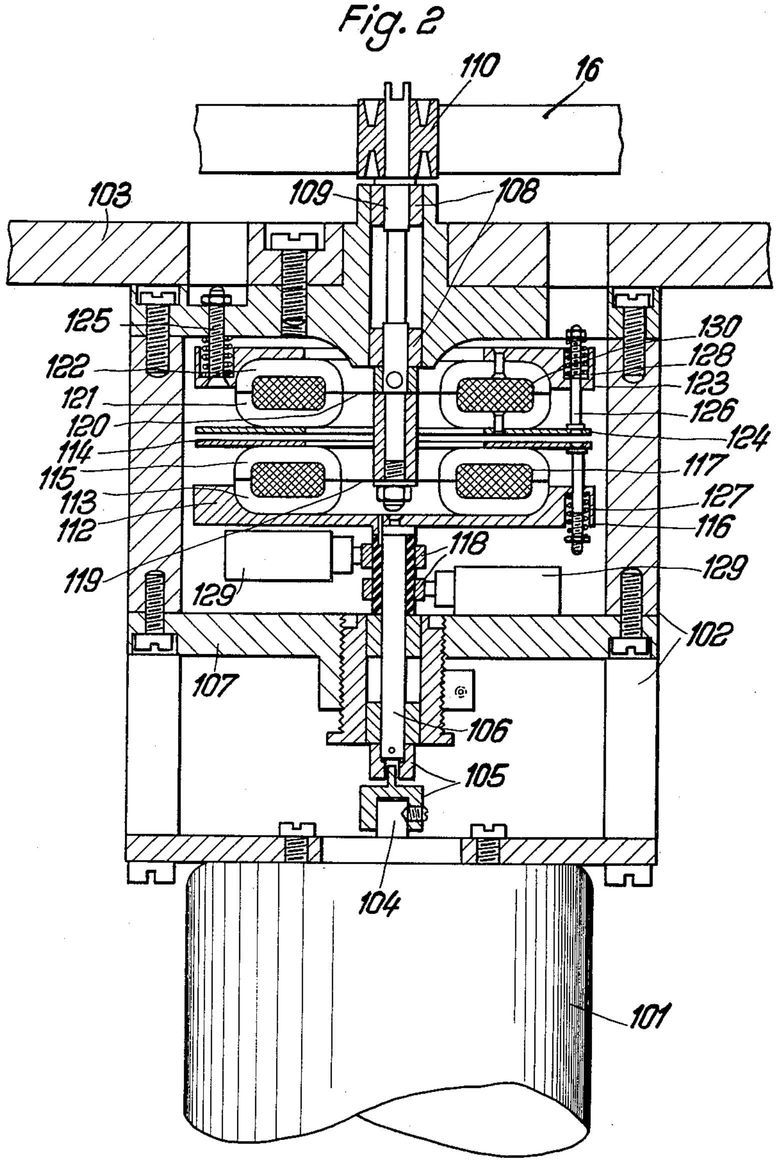
FIGURE 2 is a cross section through a clutch as shown in FIGURE 1.

FIGURE 2 shows one of the clutches 5, 6 or 7 in detail. Numeral 101 denotes in general the driving means for the clutch. This may be a separate motor, or a shaft or disc engaging a belt, such as 8, in FIGURE 1. It is important only to note that the element 101 produces a rotary motion transmitted to shaft 104. The coupling is supported in a frame 102 which, in turn, is secured to a deck portion 103 by means of screws. Deck portion 103 may be a part of the plate 1 in FIGURE 1, or another part of the tape recorder housing. A coupling 105 connects shaft 104 to shaft 106 rotatably supported by bearings and an intermediate supporting plate 107 which, in turn, forms part of the frame 102 of the clutch. A driven shaft 109 is positioned in deck portion 103 and is rotatably mounted thereto by means of bearings 108. Spindle shaft 109 is axially aligned with shaft 106 and carries on its upper end, protruding above deck portion 103, a driving wheel or reel 110 which may be, for example, capstan 18, or which may be a tape storage reel.

In case reel 110 corresponds to capstan 18 of FIGURE 1, the idler roller cooperating therewith is usually covered with rubber and will be pressed against the capstan 110 only when the entire apparatus is set into operation in order to avoid deformation of the rubber. The apparatus may be considered to be set into operation when the motor 4 in FIGURE 1 is started or, in case one uses a housing for the tape winding and unwinding when the tape winding mechanism is locked mechanically.

The upper end of shaft 106 carries a disc 112 which may be secured thereto by means of pins. Disc 112 has a cup-shaped upper surface and the lower shoe portion 113 of an electromagnet is mounted therein. The ring-shaped shoe portion 113 is axially symmetrical with respect to the axis of shaft 106. A flat ring-shaped disc 114, positioned parallel with disc 112, is supported at its lower surface on upper shoe portion 115 of the electromagnet housing. Discs 112 and 114 are interconnected by bolts 116 circularly arranged around the circumference of the discs. Thus, discs 112 and 114 rotate together with shaft 106. Inside of the two electromagnet housing portions 113 and 115, i.e., in the hollow space between them, is positioned an exciter coil 117 electrically connected to the slip rings 118 which, in turn, are mounted on shaft 106 but electrically insulated therefrom. The circumference portion of a very thin circular disc 119 is positioned between the inner edges of the ring-shaped housing portions 113 and 115 of the electromagnet. Disc 119 carries a deposited layer of hard chromium and is secured by means of screws to the lower end of shaft 109. Another disc 120 is secured somewhat above disc 119 to the shaft 109. This second disc 120 is positioned between the inner edges of two electromagnet housing portions 121 and 122 in a manner similar to the positioning of disc 119 between magnet elements 113 and 115. Discs 119 and 120 form the main coupling elements. Electromagnet shoe portions 121 and 122 are secured to ring-shaped flat discs 123 and 124, respectively, which discs are axially symmetrically positioned. Upper disc 123 is secured to frame 102 by means of screws 125 and can be subjected to a wobbling motion by means of these screws. Bolts 126 serve for the interconnection of discs 123 and 124. Coil springs 127 and 128 positioned around bolts 116 and 126, respectively, exert a very slight pressure upon the adjoining discs interconnected by the bolts.

In order to start tape feeding, the exciter coil 117 of one of the magnets will be connected electrically by means of an appropriate switch and via brushes 129 and slip rings 118 to a voltage source. Immediately, the two elements 113 and 115 now serve as magnetic cores and will be pressed together with great force by means of the magnetic field produced in them by the coil 117. Thereby, disc 119 is clamped between the elements 113 and 115 and the shafts 106 and 109 are thus coupled. The rotary motion of shaft 104 will now be transmitted to pulley or reel 110 driving the tape 16 (or driving spool 14 or 15 in FIGURE 1). To stop the tape winding, the coil 117 is disconnected from its current supply source, while coil 130 of the other magnet is excited. Now disc 119 is free from the clamping effect of elements 113 and 115, while disc 120 is clamped between stationary shoe portions 121 and 122. Shaft 109 now is decoupled from rotating shafts 106 and 104 and is stopped immediately. Starting and stopping time periods for the tape is extraordinarily short even in case of high tape speeds, because the magnets have only a very tiny distance to move in performing their clamping action. The inertia momentum of the parts to be accelerated or decelerated, like shaft 109 and the idler pressure roller, can be made very small.

In the coupling shown in FIGURE 2, the non-engaged discs slip between the magnet elements. The lifetime of the clutch discs can be increased when the gap between the elements is made slightly larger than the thickness of the disc so that the latter can run free. In this case, such a clutch can be additionally modified, so that only one disc need be employed.

Figure 3:
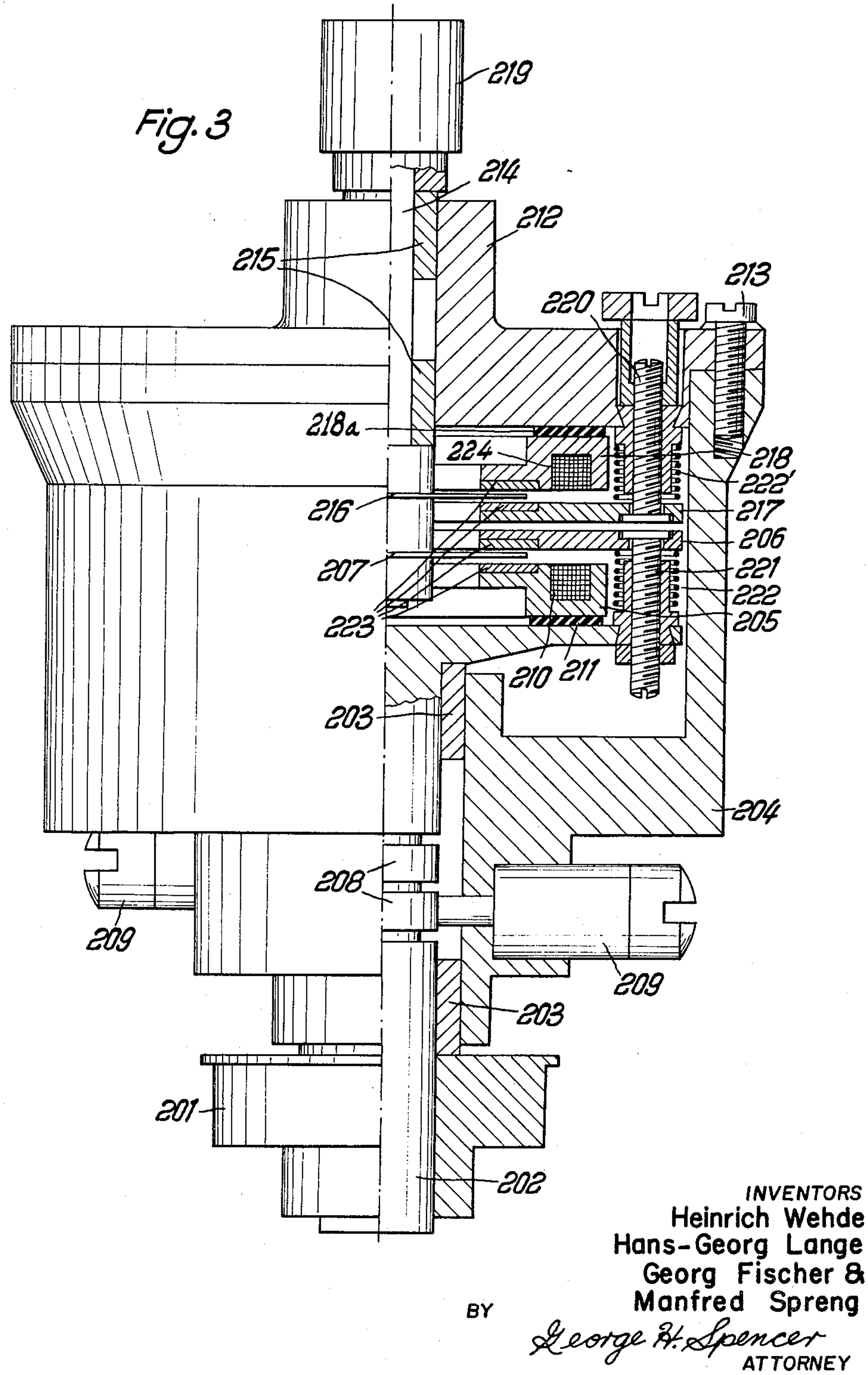
FIGURE 3 is a view partially in cross section and partially in side view of a clutch usable in a recorder as shown in FIGURE 1.
Figure 4:
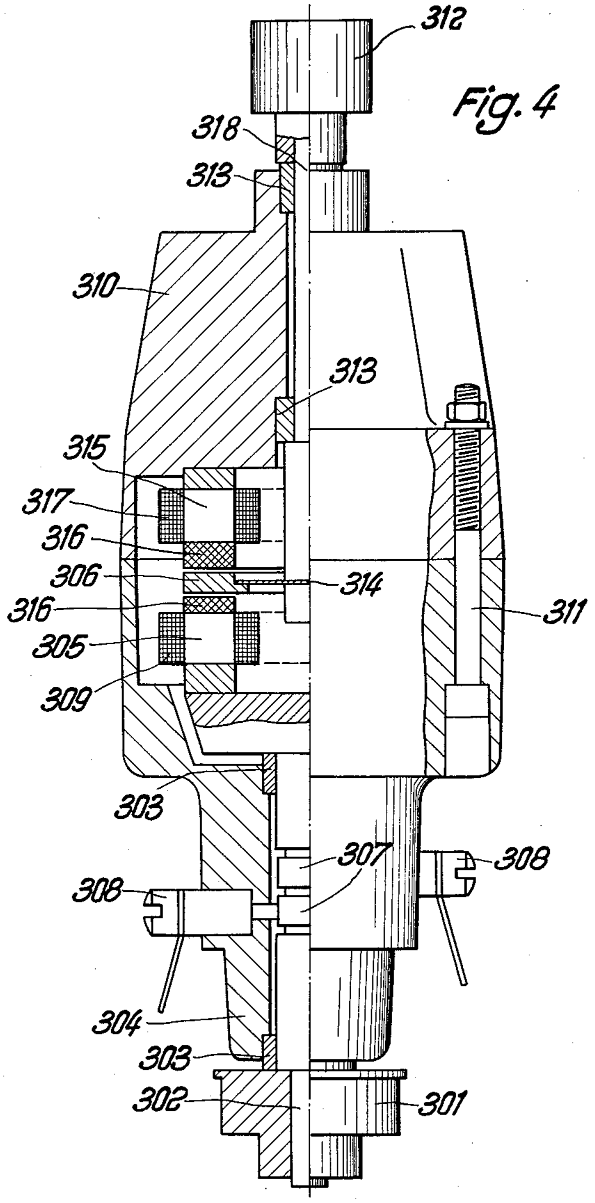
FIGURE 4 is a view partially in cross section and partially in side view of another clutch usable in a device as shown in FIGURE 1.

FIGURES 3 and 4 show such couplings in detail. In FIGURE 3, 201 is a driving wheel secured, for example, by press fit on a driving shaft 202. Wheel 201 may correspond to any of the wheels 9, 10 and 11 of FIGURE 1. Shaft 202 is supported by bearings 203 which, in turn, are secured to a housing portion 204 of the recording apparatus. A fine adjustment device (not shown) permits the axial displacement of shaft 202, whereby a magnetic core may be adjusted with respect to its exact air gap between itself and an armature 206 on the one hand and a disc 207 on the other hand. Core 205 is secured to shaft 202 by means of an electrically insulating layer 211. Armature 206 is also secured to shaft 202 by means of bolts 221. Slip rings 208 are seated on shaft 202. These slip rings 208 connect the brushes 209 to the coil 210 for exciting the core 205. The cables from the slip rings 208 to coil 210 are omitted for the sake of clarity, but this type of connection is known in the art of electrical rotary machines and does not present any problem. The core 205 is of axial symmetrical shape, similar to a trough, and embraces with a U-shaped circumference the coil 210 which is positioned therein. Upon energization of the coil, the armature will be drawn across the open part of the U-shaped core and, thereby, a coupling disc 207 is clamped with its periphery between core 205 and armature 206. The upper portion 212 of the housing is secured to the lower portion 204 thereof by means of screws 213. A spindle shaft 214 is supported in stationary housing portion 212 by means of bearings 215 and axially aligned with shaft 202. Above disc 207, another disc 216 is secured to the shaft 214. Both discs 207 and 216 may, for example, consist of hardened flat spring steel having a thickness of 0.004″. The peripheral disc 216 is positioned between a flat circular armature 217 and a core 218 of a magnet excited by a coil 224. This arrangement is similar to the positioning of disc 207 between core 205 and armature 206. Core 218 is secured to the housing portion 212 by means of electrically insulating material 218a. The armature 217 is also secured to housing portion 212 by means of a bolt 220.

Springs 222 and 222' normally engage armature discs 206 and 217 alternatively, so as to lift them from cores 205 and 218, respectively, whereby membranes 207 and 216 are also in a disengaged position. Springs 222 and 222' cause the disengagement of either one of the discs 207 or 216, or both, when the associated magnets are not energized. Disengaged discs 207 and 216 may run freely in the associated air gaps between an associated armature and core. Elements 205, 206, 217 and 218 are provided with friction layers 223, said layers being composed such that their cooperation with discs 207 and 216 yields maximum lifetime. It has been established that discs 207 and 216 may best be made of flat hardened spring steel, while layers 223 consist of a mixture of cast-iron, powdered quartz and metal chips. This mixture was placed on the magnetic elements when still in fluid state. Even after $50 \times 10^6$ switching operations, no considerable wear could be found. Layers 223 are positioned on the magnet elements in such a manner that the magnetic flux lines are not disturbed. In the present case, the layer is recessed into the magnet elements so as to leave a flat surface.

Suppose the drive disc 201 connects with wheel 10 in FIGURE 1 and is set into motion by means of a belt, such as 8 in FIGURE 1, then the electromagnet formed by coil 205 and armature 206 and excitation coil 210 is set into rotation. These parts comprise the rotary portion of the clutch. If, now, current is fed to coil 210, thus energizing this magnet, armature 206 clamps the periphery of disc 207 firmly against core 205 and the disc 207 is forced to immediately follow the rotation, whereby the drive reel 219 is also caused to rotate. Reel 219 may, for example, correspond to capstan 18 in FIGURE 1 which is to drive the tape 16 in cooperation with a pressure roller 17. If coil 224 is energized, the magnet formed by core 218 and armature 217 is excited and the disk 216 will be clamped, whereby shaft 214 and reel 219 are stopped immediately, because core 218 and armature 217 are held stationary, i.e., they are secured to the stationary recorder housing. At this time, coil 210 has to be deenergized in order to free disc 207. The exclusive alternative excitation of coils 224 and 210 can be ensured by means of a flip-flop circuit serving as an alternating switch triggered by appropriate pulses.

Turning back for a moment to FIGURE *1a*, switches 35 and 38 then have to incorporate additionally this flip-flop circuit, or they may be monostable multivibrators with two outputs, one for activating and one for deactivating the associated couplings.

In FIGURE 4, 301 denotes a driving wheel secured to shaft 302, said shaft being supported in a stationary lower housing portion 304 of the recorder by means of bearings 303. The coupling wheel 301 may correspond to any of the wheels 9, 10 or 11 in FIGURE 1. The coupling member in this embodiment is a single disc 314, the edge of which is formed as an armature 306. This armature 306 can selectively be engaged by a core 305 or by a core 315. Core 305 is secured to shaft 302 for example by means of gluing, whereby the glue serves as electrical insulation between core 305 and shaft 302. Slip rings 307 are sealed on shaft 302 to electrically connect brushes 308 to excitation coils 309 mounted on core 305.

The electric cables are not shown for sake of clarity. A core 315 is stationary and secured to an upper housing portion 310. Cores 305 and 315 have the shape of crowns.

Figure 5:
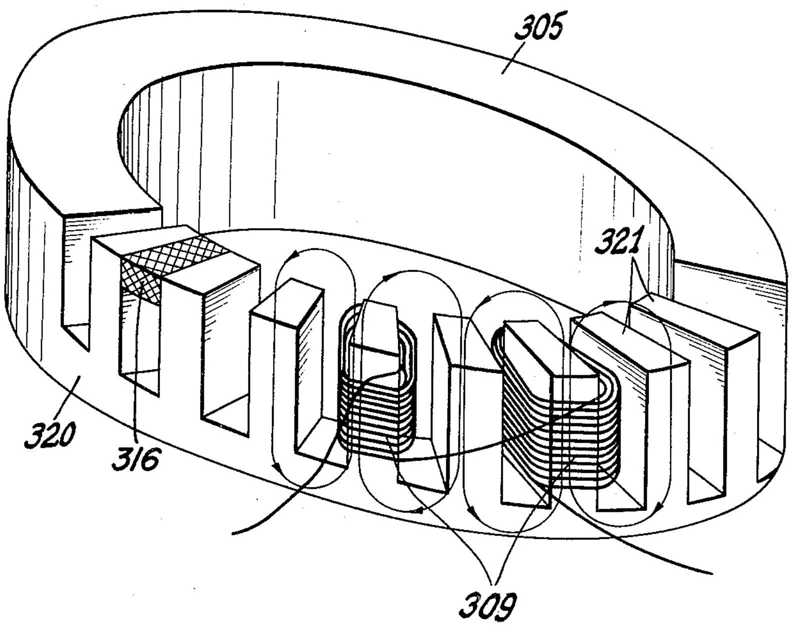
FIGURE 5 is a simplified perspective view of a magnetic element used in the clutch shown in FIGURE 4.

Core 305 is shown in more detail in FIG. 5, wherein 321 denotes the ferromagnetic teeth of the crown supported by a ferromagnetic base ring 320. Only two individual coils of the windings 309 are shown and it can be seen that only every second tooth is provided with a portion of the exciter coils. Core 315 with exciter winding 317 has a similar configuration. The crown shape of the cores has been selected in order to reduce eddy current losses, furthermore, the wear and tear is distributed which in turn means that the lifetime of the clutch is increased. The eddy current losses could be reduced also by shaping the magnets so as to provide them with a U-shaped cross section having radially directed slots.

A drive member 312 is secured to a rotary spindle shaft 318 which is rotatably supported in the upper housing portion 310 by means of bearings 313. Coupling disc 314 is secured to the lower end of shaft 318. The coupling disc 314 preferably is also a diaphragm disc made of flat hardened spring steel. It is also possible to make armature 306 and disc 314 as one integral part, whereby the required elasticity is secured by weakening the inner thickness thereof. Here one would obtain couplings which are rigid with respect to angularly or circumferentially directed forces but elastic with respect to axial forces. Upon excitation of coil 309 armature 306 is pressed across the open portions beside the teeth of core 305 whereby the magnetic field circuit is closed and shaft 302 is coupled to shaft 318 now rotating therewith. Upon deenergization of coil 309 and energization of coil 317 the armature 306 is released from core 305 and pressed against core 315, whereby shaft 318 is immediately decoupled from shaft 302 but engaged with stationary housing 310. The coupling and the decoupling is produced by friction. The cores 305 and 315 are provided with coupling layers 316. In order not to disturb the magnetic flux, the coupling layers are placed between the teeth of the crown shaped cores, above the coils and after these coils have been placed in the proper position and secured thereto during manufacturing. In order to obtain very short response time periods for coupling or decoupling, an excess current of about five times the holding circuit may be supplied to whichever one of the coils which is to be energized. The excess current may flow only for a very short period of about .2 milliseconds.

In FIGS. 2 to 5 various examples of couplings have been illustrated and they have been explained above with reference thereto. Such couplings are to be used as any of the couplings 5, 6 and 7 in FIGS. 1 and *1a*. The device shown in FIG. 1 basically can be used for either of the two running directions of tape 16 whereby simply the direction of rotation of the motor 4 has to be reversed. However, then also the functions of the two loop monitoring chambers 20 and 21 and the associated adjustments are to be reversed. A reversal of the motor is disadvantageous when it has to be carried out very fast, for example within a few milliseconds, because the masses to be decelerated and accelerated are comparatively large.

FIGS. 6, 7 and 8 show a better solution whereby every clutch is provided with two coupling members. In FIG. 6 rotatable electromagnets 501 and 502 are rotatably connected to a continuously running belt 503 by means of drive pulleys or wheels 511 and 512, respectively, so that they obtain opposite spin. Belt 503 is driven by a single non-reversible motor (not shown). FIG. *6a* shows the directions of rotation of pulleys or wheels 511 and 512 and the direction of motion of belt 503. Elements 504 and 505 are coupling members having the form of elastic discs and they are secured to driven shafts 506 and 507 of the coupling respectively. The two shafts 506 and 507 are connected to a shaft 508, for example by means of belts 509 and 510 respectively. Shaft 508 may carry either one of the reels 14 and 15 in FIG. 1 or it may carry the capstan 18. Gearing means could also be used instead of belts. Upon energization of magnet 501 coupling disc 504 engages this magnet whereby one rotary motion is transmitted from wheel 511 to shaft 506 and from this shaft to the main drive shaft 508. In case of the alternative energization of magnet 502, shaft 508 would be connected to wheel 512 via elements 502, 505, 507 and 510. Shaft 508 thereby obtains a rotary motion opposite to the one it obtained from wheel 511. Magnets 513 and 514 serve for promptly stopping the existing rotation upon demand.

In FIG. 7 and FIG. 8 is illustrated a modification of the device shown in FIG. 6 for the tape transport. The two clutches 515 and 516 correspond to the clutches shown in FIG. 6, but the driven shafts are not rotatably interconnected. There are provided separate capstans 517 and 518. These capstans 517 and 518 are to replace the single capstan 18 in FIG. 1. As can be seen in FIG. 7, the two pressure rollers 519 and 520 for tape feeding are selectively engageable with the magnetic tape 16. Upon excitation of clutch 515 and engagement of pressure roller 519 with capstan 517 the tape is fed in one direction, while upon excitation of clutch 516 and engagement of pressure roller 520 with capstan 518 the tape runs in the opposite direction.

We claim:

1. In a tape deck including two reel-carrying spindles tape-driving means comprising, in combination: motor means; reversible coupling means for quickly reversing the direction of tape drive, said coupling means incorporating pairs of electromagnetic clutch means connected with each spindle and with said capstan, drive means connected between said motor means and each of said clutches and rotating the clutches in each pair in mutually opposite directions, and direction selector means for alternatively energizing one of the clutches in each pair; a tape receiving chamber associated with each clutch-coupled spindle and located on the deck adjacent to that spindle and the capstan; tape loop forming means in each chamber continuously urging the tape to form a loop therein, the size of the loop depending upon the relative rates of rotation of the associated spindle and the capstan; loop-size monitoring means in each chamber for delivering signals indicative of the loop size; and control means connected between each monitoring means and the clutch controlling the associated spindle for coupling the drive from the motor means to that spindle to maintain the loop size between predetermined limits.

2. In a tape deck as set forth in claim 1, said tape loop forming means comprising suction means in each chamber drawing the tape loop thereinto.

3. In a tape deck as set forth in claim 1, each electromagnetic clutch means also including an electromagnetic spindle brake, and said monitoring means delivering signals serving to selectively operate the clutch means or the brake means depending on which size-limit the loop size is approaching.

4. In a tape deck as set forth in claim 3, each monitoring means comprising photoelectric loop-size detectors.

5. In a tape deck as set forth in claim 3, each monitoring means comprising an air pressure operated diaphragm connected with inductive means for determining the position of the diaphragm in the chamber.

6. In combination with a high-acceleration-rate tape deck having tape advancing means including two reel-carrying spindles and at least one tape-drive capstan and having drive motor means, electromagnetic clutch means connected between said motor means and the respective tape advancing means, said clutch means each comprising, in combination: a housing; a tape drive shaft journalled in said housing and connected with a tape advancing means; low-inertia clutch disc means comprising at least two clutch discs mounted on said tape drive shaft; a power-driven shaft journalled in said housing, aligned with said tape drive shaft and connected with said motor means; electromagnetic brake winding means fixed to said housing and cooperating with one of said discs; electromagnetic shaft coupling winding means carried on said power-driven shaft and cooperating with the other of said clutch discs, each of said winding means comprising a pair of ring-shaped ferromagnetic shoes which face each other and which are arranged on opposite sides of the respective clutch disc; and separate wiring means connected, respectively, with each of said winding means, whereby upon energization of a winding means the shoes of the respective pair of shoes approach each other and clamp the respective clutch disc therebetween, thus allowing braking or coupling to be alternatively selected.

7. In a tape deck combination as set forth in claim 6, the shoes of each pair being angularly coupled with each other, and yieldable spring means yieldably coupling said shoes in axial directions with respect to said shafts.

8. In combination with a high-acceleration-rate tape deck having tape advancing means including two reel-carrying spindles and at least one tape-drive capstan and having drive motor means, electromagnetic clutch means connected between said motor means and the respective tape advancing means, said clutch means each comprising, in combination: a housing; a tape drive shaft journalled in said housing and connected with a tape advancing means; low-inertia clutch disc means comprising at least two clutch discs mounted on said tape drive shaft; a power-driven shaft journaled in said housing, aligned with said tape drive shaft and connected with said motor means; electromagnetic brake winding means fixed to said housing and cooperating with one of said discs; electromagnetic shaft coupling winding means carried on said power-driven shaft and cooperating with the other of said clutch discs, each of said winding means comprising a pair of friction discs disposed on opposite sides of the respective clutch discs and connected together to prevent mutual rotary motion by spring loaded pin means permitting said friction discs to approach each other and clamp a clutch disc therebetween, one of said winding means being connected with each pair of friction discs to cause the pair to approach each other when the associated winding is energized; and separate wiring means connected, respectively, with each of said winding means, whereby upon energization of a winding means the friction discs of the respective pair of friction discs will approach each other and clamp the respective clutch discs therebetween, thus allowing braking or coupling to be alternatively selected.

9. In a tape deck combination as set forth in claim 8, a first friction disc in each pair supporting the associated winding means, and the second disc in the pair being made of ferromagnetic material and attracted toward the first disc when the winding means is energized.

10. In combination with a high-acceleration-rate tape deck having tape advancing means including two reel-carrying spindles and at least one tape-drive capstan and having drive motor means, electromagnetic clutch means connected between said motor means and the respective tape advancing means, said clutch means each comprising a housing; a tape drive shaft journalled in said housing and connected with a tape advancing means; low-inertia clutch disc means connected with said drive shaft; a power-driven shaft journalled in said housing and aligned with said drive shaft and connected with said motor means; electromagnetic brake winding means fixed to said housing parallel with and adjacent said disc means; electromagnetic shaft coupling winding means carried on said power-driven shaft parallel with and adjacent said disc means, each winding means having an annular wear surface, and said disc means having a peripheral ferromagnetic portion and having an inner web portion of spring-like material, whereby the peripheral portion will be attracted into contact with the wear surface of whichever electromagnetic winding means is energized, thus allowing braking or coupling to be alternatively selected.

11. In a tape deck combination as set forth in claim 10, each winding means comprising a ferromagnetic ring having axially extending teeth, and a winding on at least every alternate tooth.

12. In combination with a high-acceleration-rate tape deck having tape advancing means including two reel-carrying spindles and at least one tape drive capstan and having drive motor means, a pair of electromagnetic clutch means connected between said motor means and each respective spindle, said clutch means each comprising a housing; a tape drive shaft journaled in said housing and connected with a tape advancing means; low-inertia clutch disc means connected with said drive shaft; a power-driven shaft journalled in said housing and aligned with said drive shaft and connected with said motor means; electromagnetic brake winding means fixed to said housing parallel with and adjacent said disc means; electromagnetic shaft coupling winding means carried on said power-driven shaft parallel with and adjacent said disc means; separate wiring means connected, respectively, with each of said winding means, whereby braking or coupling may be alternatively selected; drive means connected between said motor means and each of said clutches and rotating the clutches in each pair in mutually opposite directions; and direction selector means for alternatively energizing one of the clutches in each pair.

13. In a tape deck combination as set forth in claim 12, two capstans driven in opposite directions by said motor means; idler pressure roller means associated with each capstan; and said direction selector means for alternatively energizing one of the clutches in each pair also serving for pressing one of said roller means against the associated capstan.

14. In a magnetic tape drive system wherein the tape is transported past magnetic head means and between two reels, there being loop forming means associated with said reels, the combination which comprises: drive motor means; first and second capstans having first and second braking means associated therewith, respectively; first drive coupling means for connecting said first capstan to said drive motor means such that the tape, when in engagement with said first capstan, is transported in one direction; second drive coupling means for connecting said second capstan to said drive motor means such that the tape, when in engagement with said second capstan, is transported in the opposite direction; first and second brake coupling means for connecting said first and second capstans to their respective braking means; and selector means associated with said coupling means such that at any given instant each capstan is either driven or braked.

15. The combination defined in claim 14, further comprising first and second pressure roller means associated with said first and second capstans, respectively, for pressing the tape thereagainst whenever the respective capstan is coupled to said drive motor means.

16. In a magnetic tape drive system wherein the tape is transported past magnetic head means and between two reels, there being loop forming means associated with said reels, the combination which comprises: drive motor means and braking means; at least one capstan; clutch means for alternatively coupling said capstan to said drive motor means and said braking means such that said capstan is at all times either driven or braked; a counter-pressure roller associated with said capstan for pressing the tape thereagainst at least when said capstan is coupled to said drive motor means; and additional clutch means and braking means for each of said reels, said additional clutch means being such that each reel is at all times either driven or braked.

17. The combination defined in claim 16 wherein said drive motor means consists of a single motor.

18. The combination defined in claim 16 wherein said loop forming means comprise two windings; a membrane arranged between said windings such that movement of said membrane produces different air gaps between said windings, thereby causing different voltages to appear across said windings, movement of said membrane being a function of the size of the loop; and means connecting the output of said windings to said additional clutch and braking means associated with said reels.

References Cited in the file of this patent

UNITED STATES PATENTS

| | | |
|---|---|---|
| 2,656,129 | De Turk et al. | Oct. 20, 1953 |
| 2,757,242 | Ranger | July 31, 1956 |
| 2,792,217 | Weidenhammer et al. | May 14, 1957 |
| 2,831,678 | MacNeill | Apr. 22, 1958 |